United States Patent [19]

Smith

[11] 4,345,160
[45] Aug. 17, 1982

[54] WATERWHEEL POWER GENERATOR

[76] Inventor: J. T. Smith, 225D Forrest Ave., Gainesville, Ga. 30501

[21] Appl. No.: 214,708

[22] Filed: Dec. 10, 1980

Related U.S. Application Data

[63] Continuation of Ser. No. 949,198, Oct. 6, 1978.

[51] Int. Cl.³ .............................................. F03B 7/00
[52] U.S. Cl. .................................. 290/52; 416/197 B
[58] Field of Search .................... 290/1, 43, 52, 54; 60/221, 325, 477; 416/20, 197, DIG. 4

[56] References Cited

U.S. PATENT DOCUMENTS

| | | | |
|---|---|---|---|
| 606,926 | 7/1898 | Horst | 416/197 B |
| 864,967 | 9/1907 | Hammond | 290/52 |
| 1,294,050 | 2/1919 | Chute | 416/197 B |
| 3,972,195 | 8/1976 | Hays et al. | 416/197 R X |
| 4,059,961 | 11/1977 | De La Parra | 60/325 X |

Primary Examiner—J. V. Truhe
Assistant Examiner—W. E. Duncanson, Jr.
Attorney, Agent, or Firm—Bailey, Dority & Flint

[57] ABSTRACT

An electrical power generation system includes a waterwheel contained within a housing enclosure above a water collection compartment, a water discharge nozzle in alignment with said waterwheel, means for delivering water to said discharge nozzle including a pump for returning water from the collection compartment, a portion of the output of the waterwheel being used to drive the pump, wherein the waterwheel includes fin elements having inclined water entrapping flange portions and is supported by means of an adjustable support to maintain the waterwheel dynamically balanced and in alignment with the discharge nozzle.

5 Claims, 7 Drawing Figures

WATERWHEEL POWER GENERATOR

BACKGROUND OF THE INVENTION

This is a continuation of application Ser. No. 949,198, filed Oct. 6, 1978.

While water has long been used to drive generators to generate electricity, such water power has generally involved the use of water turbines in large hydro-electric plants which use a substantial head or drop of water to generate large amounts of electrical power. Satisfactory water-powered systems which are portable and may be used on a small scale for generating a moderate supply of electrical power and which may be used with other water sources have had limited development. U.S. Pat. No. 3,984,698 discloses a waterwheel driven electrical generator directed to specially designed buckets which fold outwardly to hold a maximum of water and then fold inwardly as the water is emptied and a peripheral gear for turning the generator shaft of an electrical generator. The waterwheel is provided with a housing having inlet and outlet ports of the type requiring use with a fast flowing river or stream as the water source.

SUMMARY OF THE INVENTION

It has been found that a generally self-contained power generation system can be had by providing by a housing enclosure, a waterwheel carried within the housing enclosure in an upright manner having a plurality of fin elements, a water discharge means carried within the housing enclosure disposed above the waterwheel including nozzle means in discharge alignment with said fin elements, a water collection tank disposed below the waterwheel integral with the housing enclosure for collecting the water discharged from the nozzle means, pump means delivering water from the collection tank to the water discharge nozzle, and power means for driving the pump means. Improved nozzle and fin structure are provided for maximizing the force of the water and wheel structure is provided for maintaining the waterwheel dynamically balanced and in alignment with the water discharge.

Accordingly, an important object of the present invention is to provide an improved waterwheel power generation unit which may be used for generating moderate amounts of electrical power in an efficient manner.

Yet another important object of the present invention is to provide a waterwheel power generation system which is driven through a closed-loop water circuit which to a certain extent may be regenerative.

Still another important object of the present invention is to provide a highly efficient and simplified waterwheel structure and water nozzle for maximizing the force of water against the waterwheel.

BRIEF DESCRIPTION OF THE DRAWINGS

The construction designed to carry out the invention will be hereinafter described, together with other features thereof.

The invention will be more readily understood from a reading of the following specification and by reference to the accompanying drawing(s) forming a part thereof, wherein an example of the invention is shown and wherein.

DESCRIPTION OF A PREFERRED EMBODIMENT

Figure 1:
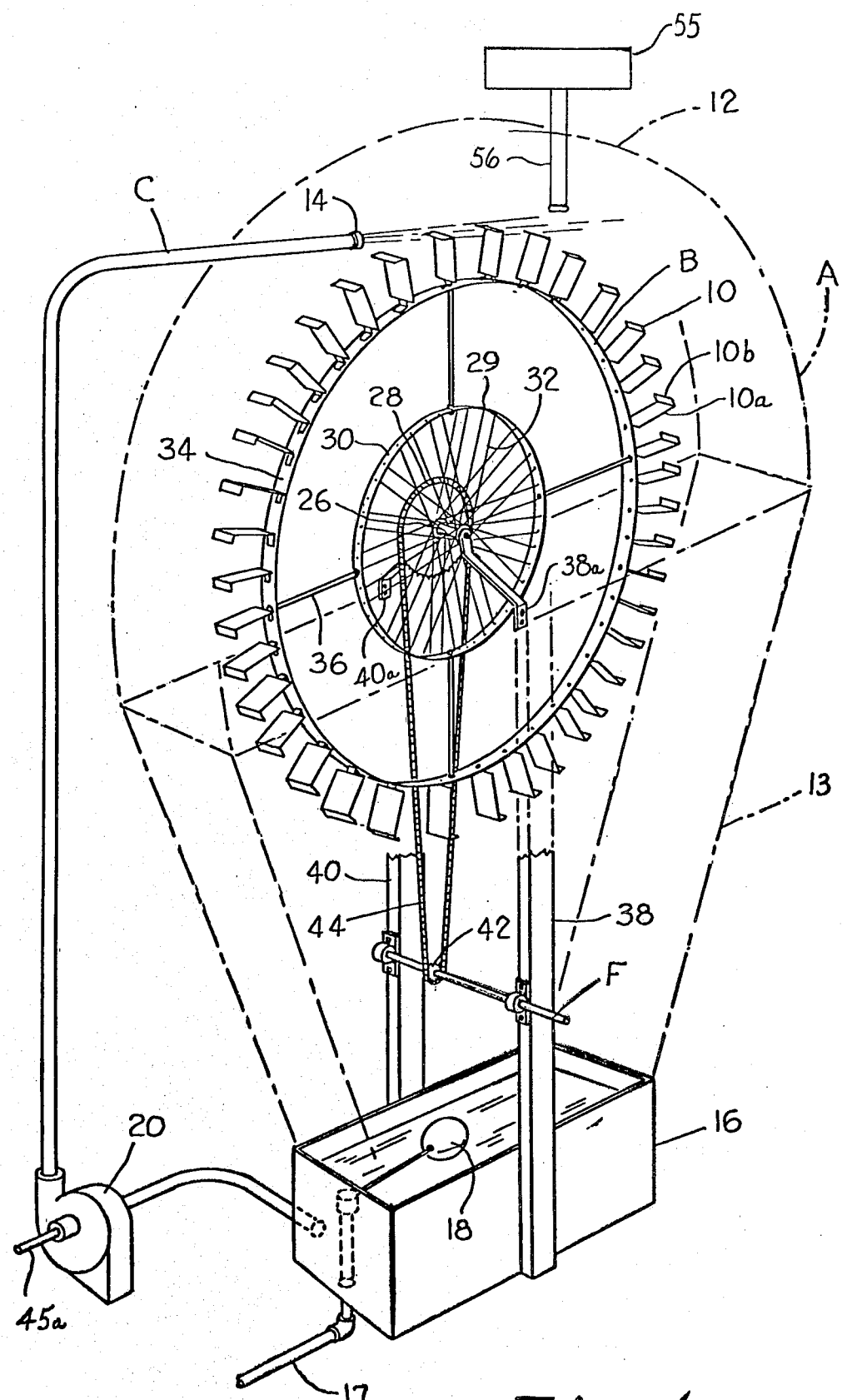
FIG. 1 is a perspective view illustrating a power generation waterwheel unit constructed according to the invention.
Figure 1A:
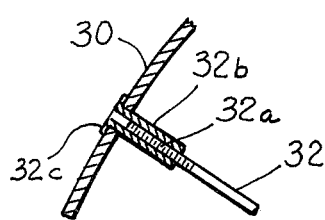
FIG. 1A is an enlarged side elevation illustrating waterwheel mounting and adjusting structure according to the invention.
Figure 2:
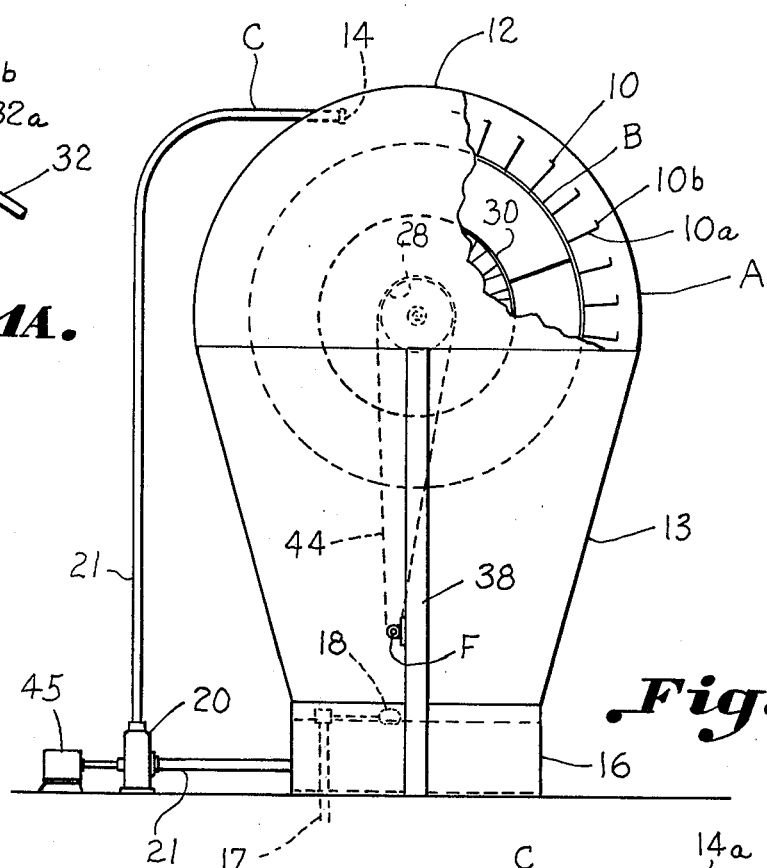
FIG. 2 is a side elevation of a self-contained waterwheel unit constructed according to the invention.
Figure 3:
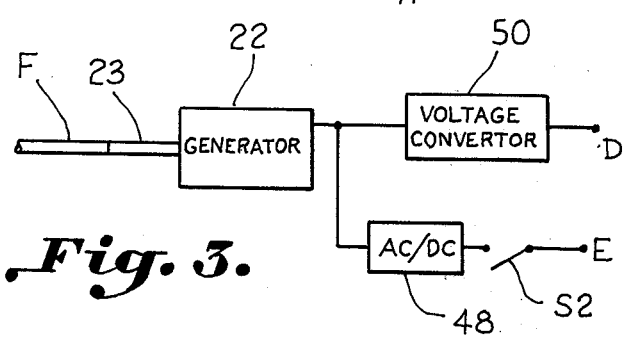
FIG. 3 is a schematic diagram of the power takeoff and electrical generator output.

Referring to the drawing, a generally self-contained power generation system is illustrated as including a housing enclosure A and a waterwheel B carried within the housing enclosure in an upright manner having a plurality of fin elements 10 for turning the waterwheel responsive to a discharge of water against the fin elements. The housing enclosure A is preferably in the form of two sections 12 and 13 affording convenient access to the waterwheel for servicing and the like. A means C for discharging water against the fin elements is carried in water discharge alignment with the fin element and includes a nozzle 14 extended well into the housing A and enclosed therein providing a solid stream of water essentially devoid of air mixture. A water collection tank 16 is made integral with the housing enclosure A for collecting the water discharged from the nozzle 14 subsequent to contacting the waterwheel. The water reservoir and collection tank 16 may be connected to any suitable supply of water 17 and is provided with a water level control means 18 which may be in the form of a conventional float valve for maintaining a minimum amount and level of water in the tank and system as needed to make up for water loss due to evaporation, etc.

A pump means 20 delivers water from the collection tank 16 to the water discharge nozzle 14 and a power means, which is at least partially regenerative, is provided for driving the pump as will be more fully explained. Conduit 21 is provided for delivering water to the suction side of pump 20 and to the nozzle 14.

An electrical generator 22 having a drive shaft 23 connected to the output of the waterwheel is provided for supplying electrical power. As illustrated, the generator includes a pair of electrical output terminals D and E.

The waterwheel is illustrated as including a shaft 24 about which the wheel rotates and a bearing hub 26 carried on a shaft. Large gear member 28 is fixed for rotation with the hub. An inner wheel unit 29 includes a rim 30 carried on the hub 26 by means of adjustable spoke support members 32 and an outer rim 34 is concentric and carried on rim 30 and hub 26 by means of spokes 36. The fin elements 10 are carried on the rim 34.

In the preferred form of support means 32, wire spokes are utilized having a threaded end 32a secured to the rim 30 by means of a female threaded connector 32b having internal threads. Connectors 32b are received in openings formed in rim 30 and held therein by a flange portion 32c. The connectors 32a may be rotated to vary the tensioning and length of the spokes 32 so as to maintain the entire wheel dynamically balanced as it rotates and to adjust the wheel whereby the discharge of water coming from nozzle 14 may be made more directly in alignment with the fin elements 10. It being contemplated that the waterwheel will be driven at very high speeds, the balancing and alignment thereof become critical. The inner wheel unit 29 may be similar to a bicycle type wheel structure.

The fin elements 10 are illustrated as including a radially extending plate member 10a and an inclined flange portion 10b which entraps impinging water against the radial element 10a for capturing the maximum force of the water thereagainst. The fin elements may be attached to rim 34 in any suitable manner such as welding.

Power takeoff means is provided in the form of shaft F which is supported on vertical standards 38 and in suitable bearings and is connected to the gear element 28 by means of a small diameter gear element 42 and a connecting drive belt member 44. Power take-off shaft F may then be coupled to generator shaft 23 by any conventional mechanical coupling. It being understood that other mechanical arrangements for driving the power take-off shaft F from the waterwheel may also be utilized. Vertical standards 38 and 40 also support waterwheel B by any suitable means such as extended fork braces 38a and 40a affixed thereto to which shaft 24 is attached with waterwheel B rotating relative to shaft 24 by means of bearing hub 26.

Figure 4:
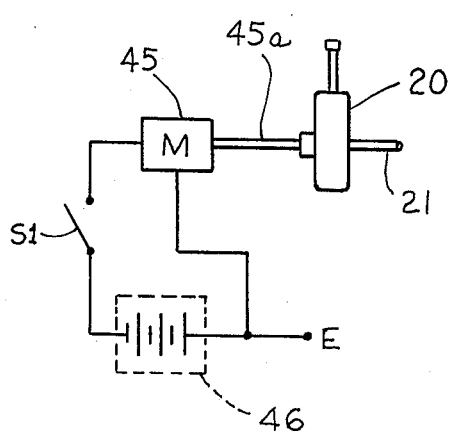
FIG. 4 is a schematic diagram of one embodiment of a power supply circuit for driving a delivery pump which returns water from a reservoir to a discharge inlet according to the invention.

In the preferred form of the invention, the pump 20 is driven by means of an electrical motor 45 through shaft 45a which is powered by a suitable DC power source 46 such as an individual or series arrangement of plural DC storage batteries connected to the motor by means of a manual switch S1. In FIG. 4, it will be noted that the power source 46 may be connected to the output terminal E of generator 22 which includes a conventional AC to DC converter 48 to convert the output of the generator to direct current whereby the electrical output of the waterwheel may be used to recharge the DC power source 46. This provides a means by which the power source 46 may be regenerated by charging when the load on main output terminal D of the electrical generator is low. For this purpose, a switch S2 is provided for selectively connecting the converted output to battery 46 through terminal E. Terminal D includes a conventional voltage converter 50 for converting the generator output at D to a standard household voltage D, such as a step-up or step-down transformer as the case shall be, Switch S2 may be manual or automatic, load sensing switching may be employed.

Figure 4A:
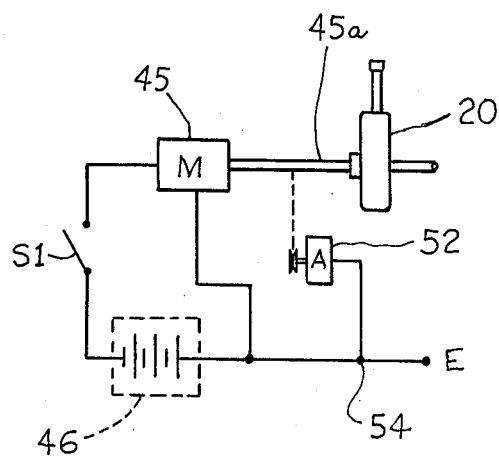
FIG. 4A is a schematic diagram of an alternate arrangement of a power supply for driving a pump for delivering water from a reservoir to the discharge inlet according to the invention.

FIG. 4A illustrates an alternate embodiment wherein an alternator 52 having a rectified output may be mechanically connected to shaft 45a by a conventional mechanical coupling and driven by motor 45 while electrically connected in circuit at 54 for charging storage battery 46. Having been taught the invention, the making of the various mechanical and electrical connections illustrated schematically and described herein will be readily apparent and within the skill of one in the art as well as grounding of the circuits to provide current flow in the proper direction according to the schematic illustrations.

Figure 5:
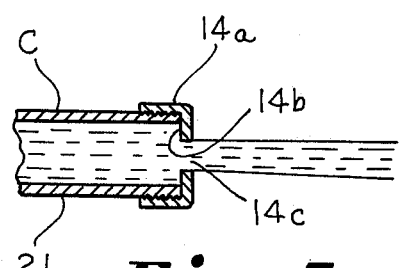

As illustrated in FIG. 5, nozzle means 14 includes a cap 14a affixed to a terminal end of a straight section of conduit 21 and includes end-plate 14b perpendicular to the cylindrical sidewall of conduit 21 which abruptly compacts water flowing therethrough and allows a discharge through reduced central aperture 14c. It has been found that the abrupt compaction against 14b affords a discharge at 14c in the form of a solid stream of water which is devoid of air. The presence of air tending to diffuse a water stream into a spray diminishes the force of water against the waterwheel.

The power generation unit so described may be utilized with a free flowing stream as a alternate main water source 55 in which event separate water discharge 56 to the wheel may be provided or discharge in combination with water delivered by pump 20 and any suitable overflow means such as chute or channel may be provided for tank 16 to accommodate a run-off of excess water.

While a preferred embodiment of the invention has been described using specific terms, such description is for illustrative purposes only, and it is to be understood that changes and variations may be made without departing from the spirit or scope of the following claims.

What is claimed is:

1. Power generating apparatus comprising:
a housing enclosure;
a waterwheel carried within said housing enclosure in an upright manner having a plurality of fin elements for turning said waterwheel responsive to a discharge of water thereagainst;
said waterwheel including a shaft;
hub means carried on said shaft;
a rim member carried by said hub means carrying said fin elements;
means supporting said rim member on said hub means including adjustment means balancing and aligning said waterwheel so that said waterwheel may be maintained in rotational balance and alignment with said discharge means;
water discharge means enclosed within said housing enclosure disposed above said waterwheel;
nozzle means carried by said discharge means extended into said enclosure housing in discharge alignment with said fin elements;
said nozzle means including a generally cylindrical sidewall terminating perpendicularly in an end plate having a reduced central water discharge aperature formed therein affording abrupt water compaction at discharge facilitating discharge of a solid stream of water generally devoid of air;
a water collection tank disposed below said waterwheel integral with said housing enclosure affording collection of said water discharge from said water discharge means;
water control means for maintaining a desired level of water in said collection tank;
supply means for delivering water to said water discharge means; and
power take-off means connected to said waterwheel and adapted for connection to a power generator.

2. The apparatus of claim 1 wherein said fin elements include radially extending water impingement elements each having a generally tangentially extending inclined flange portion for entrapping said discharge water thereagainst.

3. The apparatus of claim 1 wherein said water discharge means includes a plurality of discharge means and said supply means includes:

pump means for returning water from said collection tank to a first of said water discharge means; and power means for driving said pump means.

4. The apparatus of claim 3 wherein said power means includes an electrical motor mechanically connected to said pump for driving said pump, electrical storage battery means connected to said motor and means for recharging said storage battery.

5. The apparatus of claim 4 wherein said means for recharging said battery includes said storage battery connected to an output terminal of said generator, AC/DC converter means connected between said generator and said output terminal, and switch means for selectively connecting said storage battery in circuit with said generator and said output terminal.

* * * * *